United States Patent
McCann et al.

(10) Patent No.: US 6,263,534 B1
(45) Date of Patent: Jul. 24, 2001

(54) DELIVERY DEVICE

(75) Inventors: Gerald P. McCann, Los Angeles, CA (US); Eugene R. Kief, Jr., Reno, NV (US)

(73) Assignee: TMO Enterprises Limited, Dublin (IE)

( * ) Notice: Subject to any disclaimer, the term of this patent is extended or adjusted under 35 U.S.C. 154(b) by 0 days.

(21) Appl. No.: 09/071,363

(22) Filed: May 1, 1998

(30) Foreign Application Priority Data

May 2, 1997 (IE) .................................................. S970327

(51) Int. Cl.$^7$ ........................................................ B08B 9/04
(52) U.S. Cl. .................. 15/3.5; 15/104.061; 134/167 C; 134/168 C; 118/408
(58) Field of Search ............................ 134/167 C, 168 C, 134/201; 15/104.061, 104.062, 3.5; 118/408, 254, 105

(56) References Cited

U.S. PATENT DOCUMENTS

| | | | |
|---|---|---|---|
| 1,787,126 | * | 12/1930 | Steinnes . |
| 2,707,934 | * | 5/1955 | Curtis . |
| 3,111,431 | * | 11/1963 | Weaver . |
| 3,343,561 | * | 9/1967 | Bowerman . |
| 3,447,507 | * | 6/1969 | Poettmann . |
| 3,525,426 | * | 8/1970 | Miller . |
| 3,598,636 | * | 8/1971 | Honeycutt, Jr. . |
| 3,643,280 | * | 2/1972 | Powers . |
| 3,731,701 | * | 5/1973 | Sugeno . |
| 4,083,074 | * | 4/1978 | Curtis . |
| 4,774,905 | * | 10/1988 | Nobis . |
| 5,059,453 | * | 10/1991 | Bernsten, Jr. . |

* cited by examiner

Primary Examiner—Frankie L. Stinson
(74) Attorney, Agent, or Firm—Sughrue, Mion, Zinn, Macpeak & Seas, PLLC

(57) ABSTRACT

Disclosed is a slug for distributing a fluid on an inner surface of a bore of a pipeline. The slug comprises a reservoir for containing the fluid to be distributed, an outlet for distributing the fluid from the reservoir and onto the inner surface of the bore of the pipeline, and an arrangement for discharging fluid from the reservoir through the outlet. In use, the slug's reservoir is charged with fluid, placed in the pipeline bore, and urged along the length of the pipeline under pressure of a conveying medium, such as pressurized air, while fluid from the reservoir is dispensed onto the inner surface of the pipeline bore. The outer cross-sectional area of the slug or at least one portion thereof forms at least a partial blockage with, and slidably engages the inner surface of, the bore of the pipeline to facilitate movement of the slug through the pipeline under the action of a conveying medium. The reservoir may also be deformable for acting as the discharge arrangement for discharging the fluid from the reservoir. The slug may also be used for clearing blockages in a pipeline bore.

29 Claims, 3 Drawing Sheets

DELIVERY DEVICE

FIELD OF THE INVENTION

The present invention relates to a delivery device for distributing a fluid on an inner surface of a bore of a pipeline, typically, for distributing a cleaning fluid, such as a cleaning liquid, a disinfecting, sanitising or sterilising liquid or gas on the inner surface of a bore of a pipeline.

BACKGROUND OF THE INVENTION

Pipelines which are used for conveying materials, in particular, food grade materials where the materials are conveyed by a conveying medium, for example, conveying air, require cleaning, and may also require sanitizing at predetermined intervals. Typically, it is necessary to coat the inner surface of the bore of a pipeline with a cleaning or sanitizing liquid. Filling the pipeline with the appropriate liquid has been used. However, such an operation requires a substantial volume of liquid, with attendant costs and disposal concerns.

There is therefore a need for a delivery device for distributing a fluid on an inner surface of a bore of a pipeline run.

SUMMARY OF THE INVENTION

According to the invention there is provided a shuttle-type delivery device, hereinafter referred to as a slug for distributing a fluid on an inner surface of a bore of a pipeline. The slug is adapted to slidably engage the bore of the pipeline, and includes a reservoir for the fluid that is to be distributed on the inner surface of the bore of the pipeline. The slug also includes an outlet or outlets which communicates with the reservoir for distributing the fluid onto the inner surface of the bore of the pipeline. In use, the reservoir is charged with the fluid, placed in the bore of the pipeline, and urged through the bore of the pipeline by the conveying medium so that fluid in the reservoir is dispensed by the discharge means along the inner surface of the pipeline bore.

The invention will be more clearly understood from the following description of embodiments thereof which are given by way of example only, with reference to the accompanying drawings.

DETAILED DESCRIPTION OF THE DRAWINGS

Figure 1:
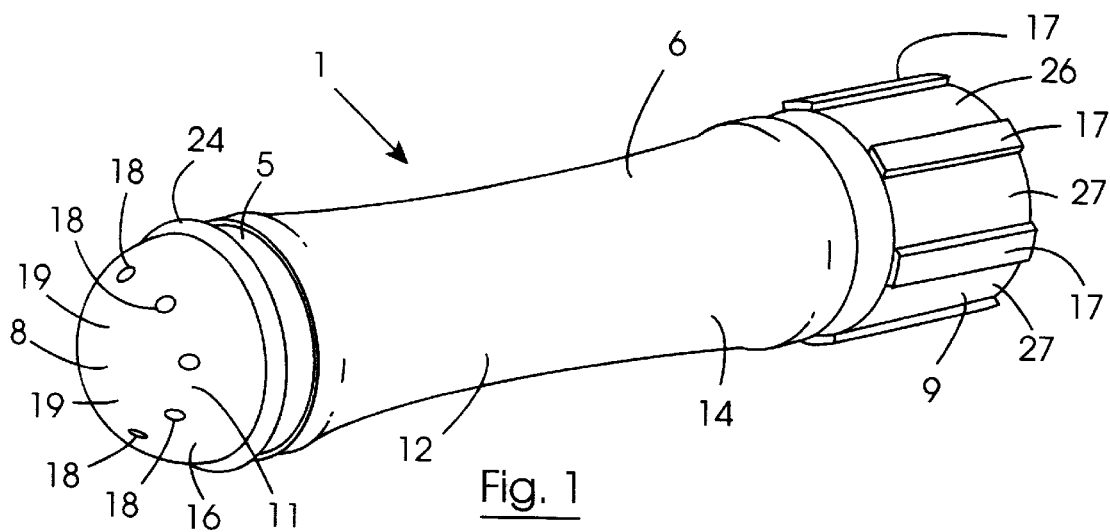
FIG. 1 is a perspective view of a first embodiment of a delivery device or slug for distributing a fluid on an inner surface of a bore of a pipeline.
Figure 2:
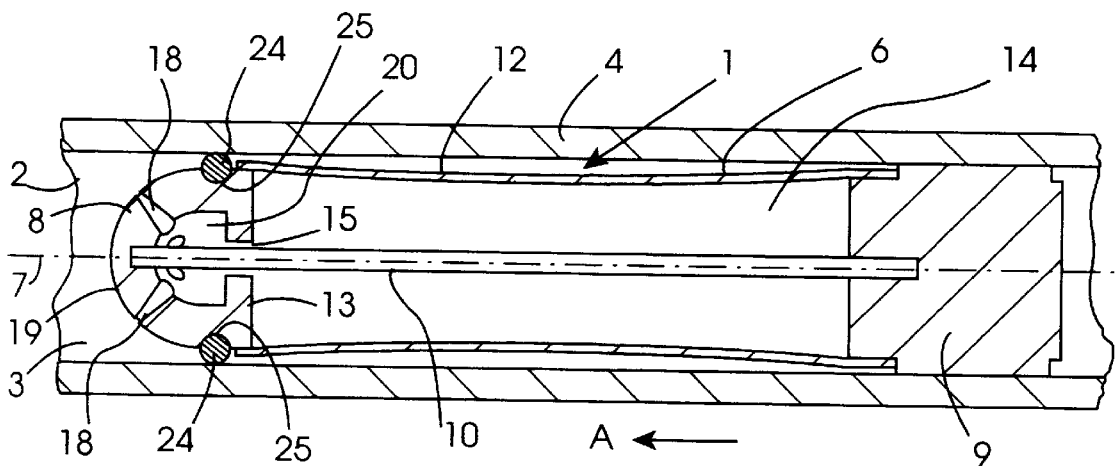
FIG. 2 is a cross-sectional side elevational view of the device of FIG. 1 in use in a pipeline, showing the slug moving in the direction indicated by arrow A.
Figure 3:
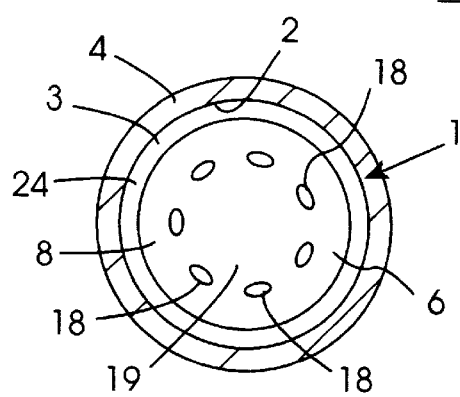
FIG. 3 is a front elevational view of the device of FIG. 1 in use in a pipeline.
Figure 4:
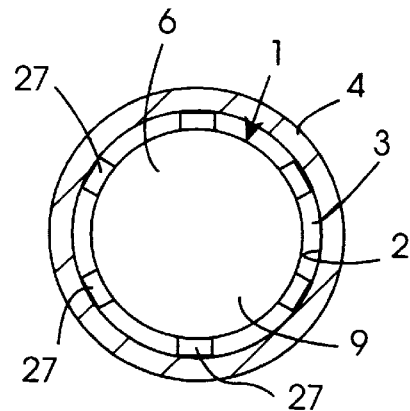
FIG. 4 is a rear elevational view of the device of FIG. 1 in use in a pipeline.

Referring to FIGS. 1 to 4 of the drawings, there is illustrated a first embodiment of a delivery device which will now be described in detail. The delivery device is indicated generally by the reference numeral 1, and distributes a fluid on an inner surface 2 of a bore 3 of circular cross-section of a pipeline 4. The delivery device 1 comprises a slug 6 that slidably engages the bore 3 of the pipeline 4, and is slidable along the bore 3 with a sealing type action as will be described below. The slug 6 defines a central axis 7 which, when the slug 6 is inserted in the bore 3, coincides with the central axis of the bore 3. The slug 6 comprises a forward plug member 8 and a rearward plug member 9 which are spaced apart from each other and interconnected by a connecting rod 10. The forward plug member 8 and rearward plug member 9 are made of a plastic material and the connecting rod 10 is of a resilient plastics material. Both the forward plug member 8 and the rearward plug member 9 are of circular cross-section and are of diameter less than the diameter of the bore 3 of the pipeline 4. A circumferential wall 12 of flexible, deformable material extends around the rod 10 between the forward and rearward plug members 8 and 9 and forms with the plug members 8 and 9 a reservoir 14 for storing the fluid which is to be distributed on the surface 2 of the bore 3 of the pipeline 4. An outlet means for distributing jets of the fluid onto the inner surface 2 of the bore 3 comprises a plurality of outlet orifices 18 which are located in a domed portion 19 of the forward plug member 8, and are spaced apart circumferentially around the central axis 7 of the slug 6. The outlet orifices 18 communicate with the reservoir 14 through a cavity 20 in the forward plug member 8. The outlet orifices 18 are arranged to direct jets 21 of the fluid from the reservoir 14 in a forward, outward direction, relative to the direction of motion of the slug 6 in the bore 3 for distributing the fluid onto the inner surface 2 of the bore 3. The outlet orifices 18 can be arranged to direct the jets 21 of the fluid in a substantially radial outward direction. The outlet orifices 18 are sized to distribute the fluid, for example a liquid detergent, in atomized spray form, and the outlet orifices 18 are spaced at appropriate distances so that the entire inner surface 2 of the bore 3 is coated with the atomized spray droplets. The slug 6 sealably and slidably engages the bore 3, and is moveable along the bore 3 of the pipeline 4 by the action of conveying air which is introduced into the pipeline 4, typically at an upstream end. A sealing means for slidably sealing the slug 6 in the bore 3 comprises an O-ring seal 24 which extends around the forward plug member 8 in a groove 25. The diameter of the O-ring 24 is such as to sealably engage the inner surface 2 of the bore 3 to limit and control the passage of conveying air beyond the slug 6, while at the same time the action of the O-ring 24 on the surface 2 of the bore 3 is sufficiently frictionless to permit slidable movement of the slug 6 in the bore 3.

A centralizing means for centralizing the rearward plug member 9 in the bore 3 comprises a plurality of longitudinally extending ribs 27 spaced apart around the rearward plug member 9 for slidably engaging the inner surface 2 of the bore 3. Additionally, the ribs 27 maintain the rearward plug member 9 spaced apart from the inner surface 2 of the bore 3 for permitting the passage of conveying air beyond the rearward plug member 9 along the reservoir 14 so that the pressure of the conveying air on the cylindrical wall 12 of the reservoir 14 is such as to deform the cylindrical wall 12 for acting as a discharge means for discharging the fluid in the reservoir 14 through the outlet orifices 18. A charging inlet (not shown) is located in the rearward plug member 9 for charging the reservoir 14 with the fluid to be distributed onto the surface 2 of the bore 3.

In use, the slug 6 is charged through the charging inlet (not shown) with the fluid which is to be distributed on the inner surface 2 of the bore 3, which typically may be a liquid detergent or sanitizing liquid. The charged slug 6 is entered into the bore 3 of the pipeline 4 at an upstream end thereof with the forward plug member 8 entering the bore 3, first followed by the reservoir 14 and then the rearward plug member 9. Once the slug 6 is fully inserted into the bore 3, a conveying medium, typically compressed air, is then delivered into the bore 3 at the upstream end of the pipeline 4 behind the slug 6, and the action of the conveying air on the slug 6 due to the fact that the O-ring seal 24 engages the inner surface 2 of the bore 3 with a sealable sliding action causes the slug 6 to move along the bore 3 in the direction of the arrow A. Simultaneously as the slug 6 commences to move along the bore 3, the conveying air which passes between the rearward plug member 9 and the inner surface 2 of the bore 3 acts on the cylindrical wall 12 of the reservoir 14 for deforming the cylindrical wall 12, thereby pressurizing the liquid in the reservoir 14, and urging the liquid through the outlet orifices 18 in the form of atomized spray jets which coat the inner surface 2 of the bore 3. Thus, as the slug 6 is urged along the pipeline 4 by the conveying air, the inner surface 2 of the bore 3 is coated with the atomized liquid from the reservoir 14. The reservoir 14 is sized to carry more than enough fluid for cleaning the pipeline 4 so that the entire surface 2 of the bore 3 is coated as the slug 6 moves from the upstream end of the pipeline 4 to the downstream end thereof.

In this embodiment, significantly more even distribution of fluid over the surface 2 of the bore 3 can be achieved than by known devices. Since the fluid is contained in the slug 6 and may be continuously discharged as the slug 6 is moved along the bore 3 of the pipeline 4, the distribution of the fluid on the surface 2 is substantially even over the entire length of the pipeline 4. By virtue of the fact that the connecting rod 10 is resilient, the slug is retained reasonably rigid, while at the same time, the resilience of the rod allows the rod to bend to accommodate the slug passing around bends and corners in the pipeline.

While one means of discharge fluid from the slug's reservoir can be through deformation induced by pressurizing liquid in the reservoir using pressure from the conveying air directly contacting the reservoir, as in the embodiment of FIGS. 1 to 4 described above, many other suitable means will be apparent to one skilled in the art. For example, a piston may be located in the reservoir, which would be urged from the rearward plug member to the forward plug member for discharging fluid from the reservoir. The piston may be urged by the action of the conveying air on the piston, or alternatively, the piston may be urged along the reservoir for discharging the fluid by the action of a spring, or any other suitable on-board power source mounted on the slug. Alternatively, the reservoir may not be deformable, but rather, fluid may be discharged from the reservoir by an on-board pump located in the slug. Such a pump may be powered, for example, by a battery or batteries located in the slug, or by a cable connected to the slug and extending from the upstream end of the bore, of sufficient length to permit the slug to pass through the bore from the upstream end to the downstream end of the pipeline.

A rotating cone may be provided on the slug for further facilitating distribution and dispersion of the fluid onto the inner surface of the bore of a pipeline. The rotating cone may be rotatable as a result of the action of conveying medium, the action of the fluid being discharged from the reservoir, or by any other suitable means. Additionally, the rotating cone may facilitate in the atomization of the fluid, where the fluid is a liquid. A cleaning means may be provided on the slug for cleaning and/or scraping the inner surface of the bore of the pipeline. For example, such a cleaning means may be provided by brushes or a brush extending around the circumference of the slug, scraper blades or the like.

Also, instead of the outlet orifices or orifice being provided in the forward end of the slug, the outlet orifices may be provided in any other suitable location along the slug. For example, the outlet orifices may be provided at the rear of the slug, for example, in a rearward plug member. The sealing means may be provided to the front or rear of the slug, or somewhere between, as compatible with the placement and configuration of the orifices, and more than one sealing means may be provided.

The speed of the slug through the pipeline may be varied by altering the delivery rate of conveying medium into the pipeline bore or by altering the pressure of the conveying medium. Additionally, the speed of the slug through the pipeline bore may be varied by increasing the number of sealing rings on the slug or by providing a drag means on the slug for slowing down the slug, for example, engagement members which would engage the inner surface of the pipeline bore. Vanes, fins or blades on the slug may also be provided for altering the speed of the slug through the pipeline bore. Indeed, any means of altering the aerodynamic drag on the slug would more than likely alter the speed of the slug through the pipeline bore. Further, brake means may be provided to slow down the slug as it approaches the downstream end of the pipeline.

Figure 5:
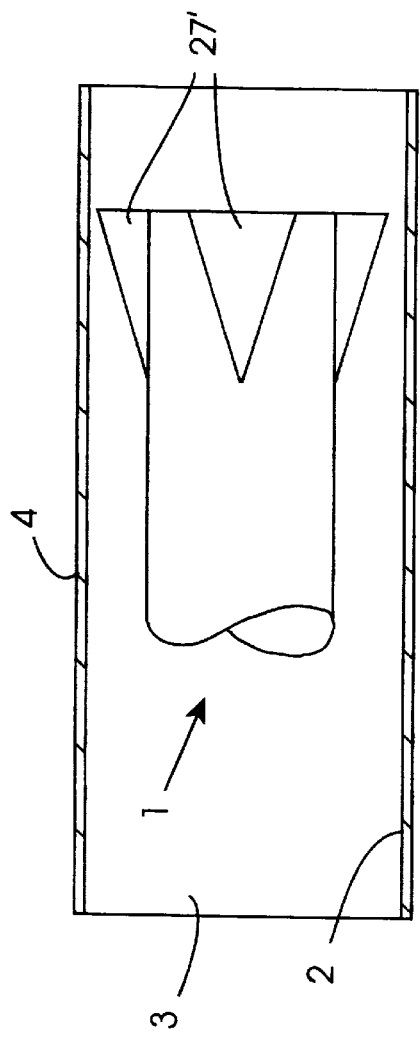
FIG. 5 is a partial side view of an embodiment similar to that of FIG. 1, showing modified ribs for enhancing fluid spreading.

Further, as shown in FIG. 5, tapered ribs 27' may be provided, for example at the rear of the slug, in order to assist in even spreading and dispersion of the fluid around 360° of the interior of the pipeline. Tapered ribs 27' may increase in width as well as height towards the rear of the slug.

As noted above, the orifices or outlets for distributing fluid on the interior of the pipe bore can alternately be at the rear of the slug. And, also as noted above, pressure from the conveying medium can be used to urge a piston forward toward a forward plug member, compressively discharging fluid from the reservoir. In both of these regards, the embodiment shown in FIGS. 6 and 7 demonstrate a second embodiment of a delivery device, described below in detail, which uses the pressure and dynamic forces on the slug to force liquid out from rearwardly placed orifices or outlets.

Figure 6:
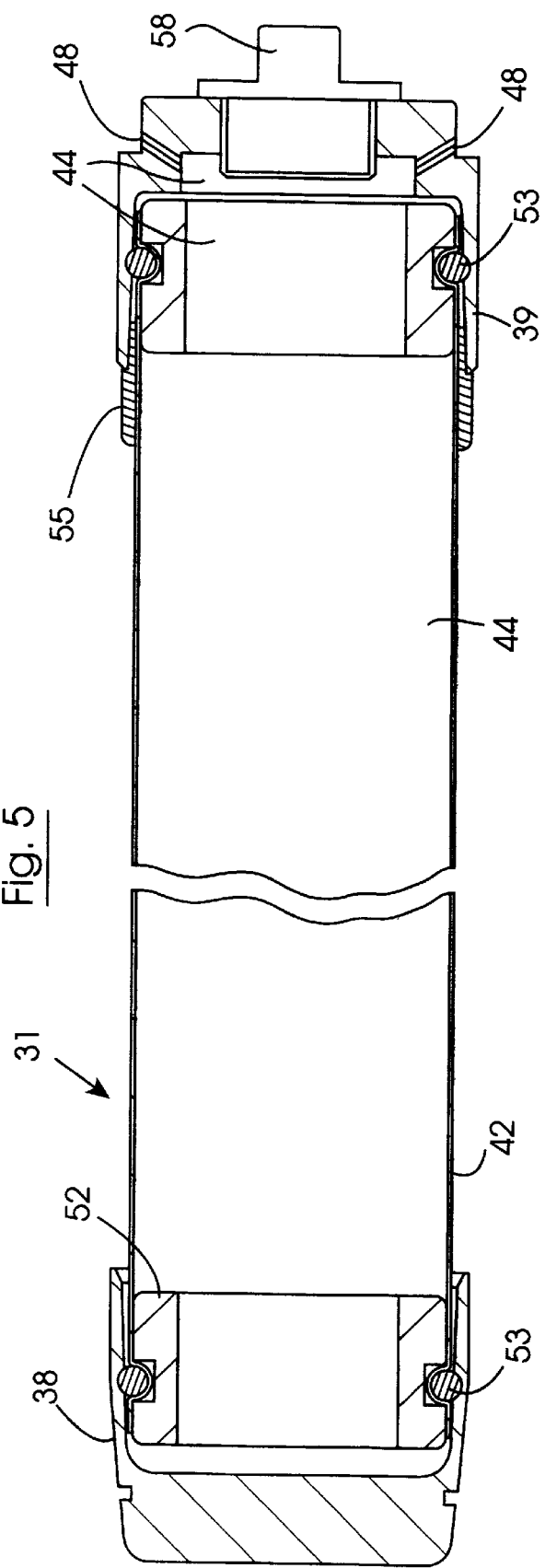
FIG. 6 is a cross-sectional side view of a second embodiment of a delivery device or slug for distributing a fluid on an inner surface of a bore of a pipeline.

As can be seen from FIG. 6, delivery device or slug 31 generally comprises a forward plug member 38 and a rear plug member 39, joined together by a fluid reservoir 44. Reservoir 44 is also contained by a circumferential wall 42, made of a flexible, deformable material. In use, the slug 31 is placed in a pipe bore (not shown), and moves in the direction indicated by the arrow marked "A" due to the pressure applied by the conveying medium through the pipe. The forward plug 38 as well as the rear plug 39 are of a diameter less than the inner diameter of the pipeline in which the slug 31 is to be used. Thus, depending on how much smaller the plugs' diameter is than that of the pipe bore, there is a degree of blockage created between the plugs and the inner surface of the pipe bore. Therefore, the pressure behind the slug 31 is greater than the pressure ahead, and the slug 31 is propelled forward through the pipeline. As the slug 31 moves forward, fluid from the reservoir 44 is ejected through orifices 48. The orifices 48 are located just behind the blockage created by the rear plug 39, near the inner surface of the pipe bore. The forward plug 38, together with an inner insert 52 and an inner O-ring 53, serves to clamp the forward end of the circumferential wall 42, thus sealing the forward end of the reservoir 44. Similarly, rear plug 39 cooperates with an inner insert 52, an inner O-ring 53, and a rear ring 55, to clamp the rear end of the circumferential wall 42, sealing the rear end of the reservoir 44. Preferably, the plugs 38 and 39, the inserts 52, and the ring 55 are made of a relatively hard material such as a hard plastic.

Figure 7:
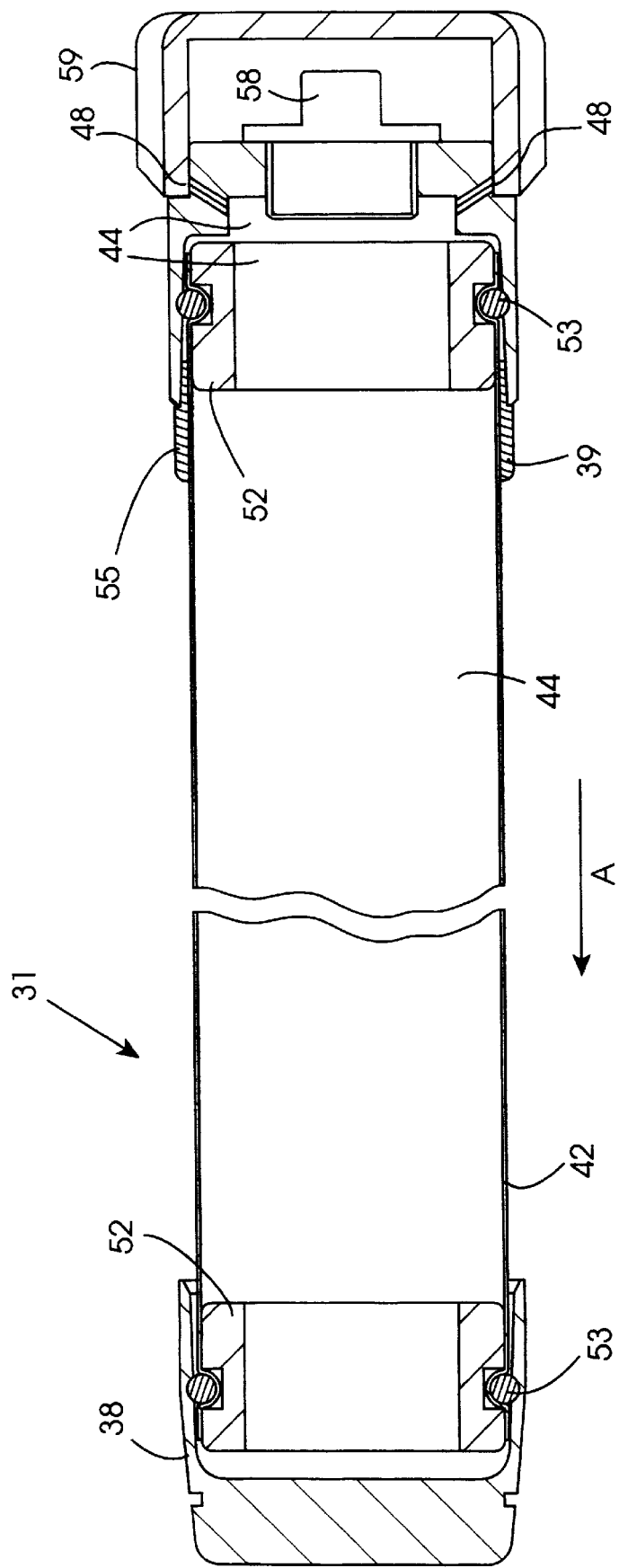
FIG. 7 is a cross-sectional side view of the embodiment of FIG. 6 showing a cap placed over the fluid outlets of the slug to prevent leakage while the slug is not in use.

Centrally located in the rear part of the rear plug 39 is an aperture which is sealed by a stopper 58. The stopper 58 can be removed by a user to allow access to the aperture so that fluid can be conducted into the reservoir 44; after suitable filling of the reservoir 44, for example two-thirds full with liquid, the stopper 58 is then put back in place to seal the aperture. Thus, the only outlet for any fluid contained in the slug 31 fully assembled, is through the orifices 48, which are placed in spoke-like fashion through the rear plug 39 at its periphery just rear of the widest diameter portion of the plug. As shown in FIG. 7, the orifices too can be closed by placing the cap 59 over the end of the rear plug 39, with which it is configured to snugly mate. Thus, the cap 59 allows the filled slug 31, when not in use in a pipeline, to be handled, transported, etcetera, without fluid leaking from the reservoir 44.

Although the applicants do not wish to be bound by any theorem, it is believed that since the wall 42 connecting the two plug members 38 and 39 is flexible, the rear plug member 39 may act somewhat as a "piston," to the extent that there is an opposing force exerted by the sliding friction of the forward plug member 38 through the pipeline. Also, during the initial period of acceleration, inertia of the slug 31 as a whole will initially oppose the forward motion of the rear plug member 39, causing compression of the reservoir 44 and the discharge of fluid therefrom. Such acceleration may operate on the liquid as well. If the reservoir is filled partially with gas, it may be better able to accommodate loss of liquid volume. It is noted that another advantage of placing gas and liquid rather than, for example just liquid, in the reservoir, is that flexibly of the reservoir, and thus the ability to pass through bends in the pipeline, is enhanced by the gas, which is compressible. In the embodiment shown, it has been found that filling the reservoir with about one-third gas and two-thirds liquid results in favorable overall performance.

Also, it will be noted that in the embodiment shown in FIGS. 6 and 7, the outlet orifices 48 are located very close to the region where the seal is created between the pipeline bore and the rear plug member 39. To the extend that the seals created by the plug members 38 and 39 allow the conveying medium to pass by the seals under the pressure of the conveying medium, the region around the seals will have an increased velocity of flow due to the constriction in the cross-sectional area at the region of the seal. Accordingly, due to the acceleration in velocity of the conveying medium in that region, a region of relatively decreased pressure may be created. To the extent the orifices are placed in that region, fluid may be drawn out from the orifices by the pressure differential. In this regard, reference is again made to Whitaker's "Introduction to Fluid Mechanics."

It should be noted that with both of the embodiments of FIGS. 1–5 and FIGS. 6–7, the length of the reservoir can be selected to correspond to the length of the pipeline in which the slug is to be used. For example, with a two inch inner diameter pipeline of 100 feet, a slug having in the neighborhood of an approximately one foot reservoir might beneficially be used, depending on the particular application and the number of uses that were desired before refilling became necessitated. Further, the reservoirs could be made in various predetermined standard sizes, and could be incorporated into, or provided separately from the rest of the slug assembly for assembly prior to use.

Further, instead of using the cap 59 shown in FIG. 7, a disposable version of the slug may be made, with the reservoir being factory-filled and sealed with, for example, an adhesive peel-off layer over the orifices.

Further still, any other suitable conveying medium besides air may be used for moving the slug through the pipeline bore, and where air is the conveying medium, the conveying air may be provided from any suitable air source. Additionally, although the preferred embodiments are described as using the application of a higher pressure on the upstream end of the pipeline in order to push the slug forward in the downstream direction, variations could be readily imagined wherein the slug is instead pulled toward the downstream direction by the application of a reduced pressure at or near that end. Further, the terms "upstream" and "downstream" as used herein do not necessarily comport with the ordinary direction of flow of the pipeline's contents when the pipeline is in use for its intended application, but instead simply serve to denote the direction of the slug's movement when in use in the pipeline's bore.

Also, in addition to the utility of delivering fluids to the inside of the bore of a pipeline, the slug may also be suitable for clearing blockages in the pipeline, for example, a blockage due to water or the like where the pipeline is used for conveying particulate, flake or lump material, such as, for example, ice lumps, ice particles, ice flakes or slush ice.

Further, many of the possible variations mentioned herein with reference to the embodiment of FIG. 1 to 5 will also be applicable to the embodiment of FIGS. 6 and 7 (and other embodiments), and vice versa. Thus, the invention is not limited to the particular preferred embodiments described herein, and is only limited as in the claims appended hereto.

We claim:

1. A slug for distributing fluid on an inner surface of a bore of a pipeline, the slug comprising:
    a forward plug member, and
    a spaced apart rear plug member,
    each plug member being adapted to slideably engage the inside of the pipeline bore,
    a fluid reservoir defined between the respective plug members by a wall extending therebetween, the wall being of a flexible material for reducing the tendency of the slug to jam when it is passed through bends in the pipeline, and
    at least one outlet orifice in one of the plug members communicating with the reservoir and adapted to allow discharge of fluid from the reservoir to the inner surface of the pipeline.

2. A slug according to claim 1, wherein at least one of the plug members creates a partial blockage when placed in said pipeline bore.

3. A slug according to claim 2, wherein said reservoir is made such that the slug can be passed through elbows and bends in the pipeline without tending to get jammed inside the pipeline.

4. A slug according to claim 1, further comprising a selectively openable inlet into said reservoir, said inlet being large enough when opened to allow facile filing of said reservoir with fluid.

5. A slug according to claim 1, wherein said reservoir is contained at least in part by a piston member that is movable in response to the application of a force oriented generally co-axially with the slug.

6. A slug according to claim 1, wherein said wall is deformable in response to the application of a differential in pressure across it for urging the fluid from the reservoir through the outlet orifice.

7. A slug according to claim 6, wherein said forward plug member includes an annular seal, and said at least one outlet orifice is placed forward of said seal.

8. A slug according to claim 7, further comprising a resilient connecting rod through said reservoir.

9. A slug according to claim 1, wherein said at least one outlet orifice is a plurality of radially arranged orifices each having exits that are close to the inside of the pipeline bore when the slug is placed concentrically therein.

10. A slug according to claim 9, wherein said orifice exits are just rearward from the partial blockage created by said at least one plug member when placed in the pipeline bore.

11. A slug according to claim 1, wherein said at least one outlet orifice is a plurality of outlet orifices arranged in spoke-like fashion and oriented to direct fluid in an outward direction toward the inside of said pipeline bore.

12. A slug according to claim 1, wherein said outlet orifices comprise atomizing means to atomize a fluid passing therethrough from the reservoir.

13. A slug according to claim 1, wherein said reservoir is filled at least partially with the fluid to be distributed on the inner surface of the pipeline bore.

14. A slug according to claim 1 wherein a discharge means is provided for selectively discharging fluid from the reservoir through the at least one outlet orifice.

15. A slug for distributing fluid on an inner surface of a bore of a pipeline, the slug comprising:
at least one plug member adapted to slidably engage the inside of the pipeline bore,
a fluid reservoir connected to the at least one plug member and comprising a deformable wall adapted to be deformed when subjected to a pressure differential for discharging fluid therefrom, and
at least one outlet orifice communicating with the reservoir for accommodating discharge of fluid from the reservoir on deformation of the wall of the reservoir in response to the pressure differential.

16. A slug according to claim 15, wherein the at least one plug member comprises a forward plug member, and the fluid reservoir extends rearwardly from the forward plug member.

17. A slug according to claim 16, wherein the forward plug member creates a partial blockage when placed in the pipeline bore so that when the pipeline is pressurized upstream of the slug the slug is urged forwardly in a downstream direction through the pipeline bore, and the pressurization of the pipeline develops a pressure differential across the deformable wall of the reservoir for deformation thereof for urging the fluid from the reservoir through the outlet orifice.

18. A slug according to claim 15, wherein the at least one outlet orifice is located in the at least one plug member.

19. A slug according to claim 15, wherein the at least one outlet orifice directs the fluid in an outward direction towards the inside surface of the pipeline bore.

20. A slug according to claim 15, wherein a plurality of outlet orifices are provided in the at least one plug member spaced apart circumferentially around the plug member.

21. A slug according to claim 15, wherein the reservoir is of a flexible deformable material.

22. A slug for distributing fluid on an inner surface of a bore of a pipeline, the slug comprising:
a forward plug member, and
a spaced apart rear plug member,
each plug member being adapted to slideably engage the inside of the pipeline bore,
a fluid reservoir located between the respective plug members,
at least one outlet orifice in one of the plug members communicating with the reservoir and adapted to allow discharge of fluid from the reservoir to the inner surface of the pipeline,
a selectively activatible pump connected to the reservoir for discharging fluid from the reservoir through the at least one outlet orifice, the reservoir being contained at least in part by a wall that is deformable in response to the application of differential pressure across it, so that the wall also comprises at least part of the selectively activatible pump.

23. A slug for distributing fluid on an inner surface of a bore of a pipeline, the slug comprising:
a forward plug member, and
a spaced apart rear plug member,
each plug member being adapted to slideably engage the inside of the pipeline bore,
a fluid reservoir located between the respective plug members,
at least one outlet orifice in one of the plug members communicating with the reservoir and adapted to allow discharge of fluid from the reservoir to the inner surface of the pipeline,
a selectively activatible pump connected to the reservoir for discharging fluid from the reservoir through the at least one outlet orifice, and
a piston member forming at least a part of the reservoir, the piston being movable in response to the application of a force oriented generally co-axially with the slug, so that the piston member also comprises at least a part of the selectively activatible pump.

24. A slug according to claim 23, wherein said pump, when activated, causes a substantially constant rate of discharge of fluid from said reservoir and out through said at least one outlet orifice.

25. A slug for distributing fluid on an inner surface of a bore of a pipeline, the slug comprising:
a forward plug member, and
a spaced apart rear plug member,
each plug member being adapted to slideably engage the inside of the pipeline bore, one of said forward and rear plug members being a guide member that is configured to centeringly and slidingly engage with the inside of the pipeline bore, but not form a significant blockage to movement of a conveying medium through the pipeline bore,
a fluid reservoir located between the respective plug members by a wall extending therebetween, and
at least one outlet orifice in one of the plug members communicating with the reservoir and adapted to allow discharge of fluid from the reservoir to the inner surface of the pipeline.

26. A slug according to claim 25, wherein the guide member comprises a plurality of longitudinally extending ribs spaced apart circumferentially around the outer surface of the guide member.

27. A slug according to claim 26, wherein said ribs are tapered with an increasing height moving toward the rear of said guide member.

28. A slug according to claim 27, wherein said ribs are also tapered with an increasing width moving toward the rear of said guide member.

29. A slug according to claim 25, wherein said reservoir is defined between said forward and rear plug members by a flexible, deformable wall extending therebetween, and said reservoir is filled partially with gas and the remainder is filled with a liquid to be dispensed.

* * * * *